United States Patent
Crotty, III

(10) Patent No.: US 6,254,168 B1
(45) Date of Patent: Jul. 3, 2001

(54) SUN VISOR WITH VANITY MIRROR

(75) Inventor: Willard E. Crotty, III, Quincy, MI (US)

(73) Assignee: Crotty Corporation, Quincy, MI (US)

( * ) Notice: Subject to any disclaimer, the term of this patent is extended or adjusted under 35 U.S.C. 154(b) by 0 days.

(21) Appl. No.: 09/510,063

(22) Filed: Feb. 22, 2000

Related U.S. Application Data

(60) Provisional application No. 60/179,257, filed on Jan. 31, 2000.

(51) Int. Cl.$^7$ .......................................................... B60J 3/00
(52) U.S. Cl. ........................ 296/97.2; 296/97.1; 296/97.5
(58) Field of Search ................................. 296/97.1, 97.2, 296/97.5

(56) References Cited

U.S. PATENT DOCUMENTS

| | | | |
|---|---|---|---|
| 4,411,467 | 10/1983 | Cziptschirsch et al. | |
| 4,494,789 | * 1/1985 | Flowerday | 296/97.1 |
| 4,570,990 | * 2/1986 | Flowerday | 296/97.1 |
| 4,685,723 | 8/1987 | Canadas | |
| 4,922,391 | 5/1990 | Dykstra | |
| 5,007,532 | * 4/1991 | Binish | 296/97.1 |
| 5,031,951 | * 7/1991 | Binish | 296/97.1 |
| 5,308,137 | * 5/1994 | Viertel | 296/97.1 |
| 5,318,336 | * 6/1994 | Aymerich et al. | 296/97.1 |
| 5,338,082 | 8/1994 | Miller | |
| 5,553,907 | * 9/1996 | Finn et al. | 296/97.1 |
| 5,603,547 | * 2/1997 | Finn et al. | 296/97.1 |
| 5,678,879 | * 10/1997 | Mailander et al. | 296/97.1 |
| 5,695,237 | * 12/1997 | Erickson et al. | 296/97.1 |
| 5,716,092 | * 2/1998 | Dellinger et al. | 296/571 |
| 5,887,933 | * 3/1999 | Peterson | 296/97.1 |
| 6,033,005 | * 3/2000 | Crotty, III | 296/97.1 |

* cited by examiner

*Primary Examiner*—D. Glenn Dayoan
*Assistant Examiner*—Lori L. Coletta
(74) *Attorney, Agent, or Firm*—Baker & Daniels

(57) ABSTRACT

A sun visor with a plate member disposed within the visor's shell. A vanity mirror is disposed within an opening in the shell and attaches to the plate member via heat stake technology. The plate member doubles as a conventional "core member," thereby obviating the latter. The plate member is slanted relative to the shell and creates a cavity into which the vanity mirror fits. The vanity mirror is thereby attractively recessed within the opening. No adhesives or fasteners are used to secure the upholstery cover to the visor shell around the opening. Instead, the upholstery cover partially covers the opening and is stretched and securely held in place between the back of the vanity mirror and the plate member.

23 Claims, 5 Drawing Sheets

SUN VISOR WITH VANITY MIRROR

This application claims benefit of Provisional appl. No. 60/179257, filed Jan. 31, 2000.

BACKGROUND

The present invention relates to sun visors of the type having a substantially self-supporting relatively thin shell folded into two shell halves with an upholstery cover covering the shell. In particular, the present invention relates to more simply and economically producing a sun visor of the type described with a vanity mirror assembly.

Various methods have been utilized to secure a vanity mirror to a sun visor.

For example, U.S. Pat. No. 4,411,467 to Cziptschirsch et al. discloses a visor body having a recess for holding a mirror. The section of the covering layer overlapping the recess is more expandable than the remainder of the covering layer. To make this section more expandable, it is punched with holes defining a lattice of the material, and various shaped holes are disclosed. In this configuration, the covering does not have a peripheral free end portion located within the aperture and between shell halves.

U.S. Pat. No. 4,685,723 to Canadas discloses a mirror disposed in a detachable support which is fixed in the cavity of a visor by hooking tabs located on the support into corresponding openings provided in a metal insert. During manufacture of the visor, the metal insert is placed in the bottom of the cavity and covered with a film of foam, and then the entire visor shell is covered with a vinyl cover. Thereafter, the elastic tabs extending from the detachable support are hooked through the vinyl cover to engage the edges of openings formed in the metal insert, thereby securing the vanity to the visor.

U.S. Pat. No. 4,922,391 to Dykstra discloses a vanity mirror package which is lockably retained within a visor body formed of a folded polymeric core. The core forms a recess, and the vanity mirror package is snap-fitted and held within the recess by means of a pair of facing spaced resilient arms which extend rearwardly from the front core half and include inwardly projecting locking tabs on their ends cooperating with backing tabs to hold the vanity mirror package in place.

U.S. Pat. No. 5,338,082 to Miller discloses a sun visor of the type formed from two shell halves folded together with one of the shell halves having an opening therein for insertion of the vanity mirror. An aperture is formed in the upholstery cover approximately the same size as the opening in the shell and is aligned therewith. The free end of the cover folds around the opening and extends into the inside periphery of the opening. Slits are formed in the free end and are placed over a plurality of stakes located around the periphery of the opening and which extend inwardly from the interior of the shell. A bezel having openings spaced to correspond to the stakes is fit over the stakes and sandwiches the free end of the cover against the inside of the shell. The bezel includes sharp prongs which further secure the free end of the cover.

It is desirable to improve and simplify the attachment of a vanity mirror to a sun visor, and to improve and simplify the overall structure of the sun visor.

SUMMARY OF THE INVENTION

The present invention provides a sun visor with a plate member disposed within the visor's shell. The vanity mirror is disposed within an opening in the shell and attaches to the plate member via heat stake technology. The plate member doubles as a conventional "core member," thereby obviating the latter.

In one form thereof, the present invention provides a sun visor for use in a vehicle. The sun visor comprises a shell having first and second shell halves folded together, the first shell half defining an opening therethrough. A plate member is disposed between the shell halves and aligned with the opening. The plate member is spaced away from the first shell half. A vanity mirror assembly is disposed proximate the opening and is attached to the plate member.

In a preferred form, either the plate member or the vanity mirror includes stakes, the other includes holes to receive the stakes. The stakes are fused into the holes via heat stake technology. Preferably, the back of the vanity mirror assembly includes the stakes and the plate member includes the holes. The sun visor includes an upholstery cover which covers an exterior of the shell and a portion of the cover is disposed over said opening. In this preferred form, one of the stakes extends through the portion of the cover.

In another preferred from, the plate member is disposed on a slant relative to the first shell half and the plate member is aligned substantially parallel to the second shell half The plate member further includes a wall member depending therefrom, the wall member being of variable height and having a substantially flat edge abutting against the first shell half, whereby the wall member defines the slant.

In another form thereof, the present invention provides a method of installing a vanity mirror in a sun visor of the type having a substantially self-supporting relatively thin shell folded into two shell halves with an upholstery cover covering the shell. The method comprises forming an opening in one of the shell halves to accommodate the vanity mirror. An upholstery cover is installed on an exterior surface of the shell and at least partially covers the opening. A plate member is placed against the half having the opening and is aligned with the opening. The vanity mirror is aligned with the opening and a stake extending from the back of the vanity mirror is fused into a hole formed in the plate member, thereby securing the vanity mirror to the sun visor.

One advantage of the present invention is that the plate member to which the vanity mirror attaches eliminates the need for a "core member" which is typically present in the type of sun visor subject of the present invention. The plate member doubles as the structural core of the inventive sun visor.

Another advantage of the present invention is that the upholstery cover need not be cut around the opening provided in the shell for the vanity mirror. Instead, the cover covers the opening, and as the vanity mirror is installed, it stretches the upholstery cover and sandwiches it between the plate member and the back of the vanity mirror. Meanwhile, the heat stakes "punch" through the cover and fuse into the holes provided for same in the plate member. In this manner, the cover fits tightly around the opening, yet several process steps, e.g., cutting the cover, securing it around the opening, etc., are avoided. Such a process is quicker and less expensive than prior art processes.

Yet another advantage of the present invention is that the vanity mirror can be attractively recessed within the shell without the need for extra parts or process steps.

The plate member includes walls of variable height which space the plate member away from the opening, thereby creating a cavity into which the vanity mirror is placed.

Yet still another advantage of the present invention is that the recessed vanity allows the visor cross-section to be thinner than the cross-section of a visor which is mounted to the surface. Additionally, the present invention permits attachment of the vanity mirror by means of other means than heat staking.

BRIEF DESCRIPTION OF DRAWINGS

The above-mentioned and other advantages and objects of this invention, and the manner of attaining them, will become more apparent and the invention itself will be better understood by reference to the following description of embodiments incorporating the invention taken in conjunction with the accompanying drawings, wherein.

Figure 1:
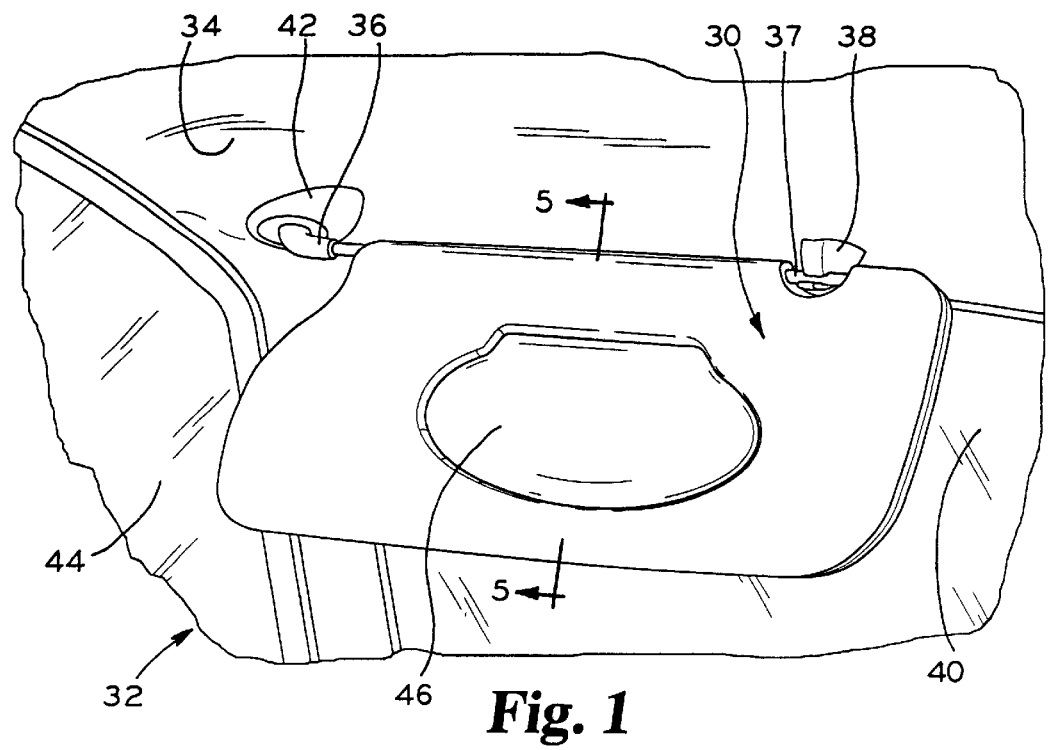
FIG. 1 is a perspective view of a sun visor in the context of an interior space of an automobile.

Corresponding reference characters indicate corresponding parts throughout the several views. Although the drawings represent embodiments of the invention, the drawings are not necessarily to scale and certain features may be exaggerated in order to better illustrate and explain embodiments incorporating the present invention.

DETAILED DESCRIPTION

Figure 2:
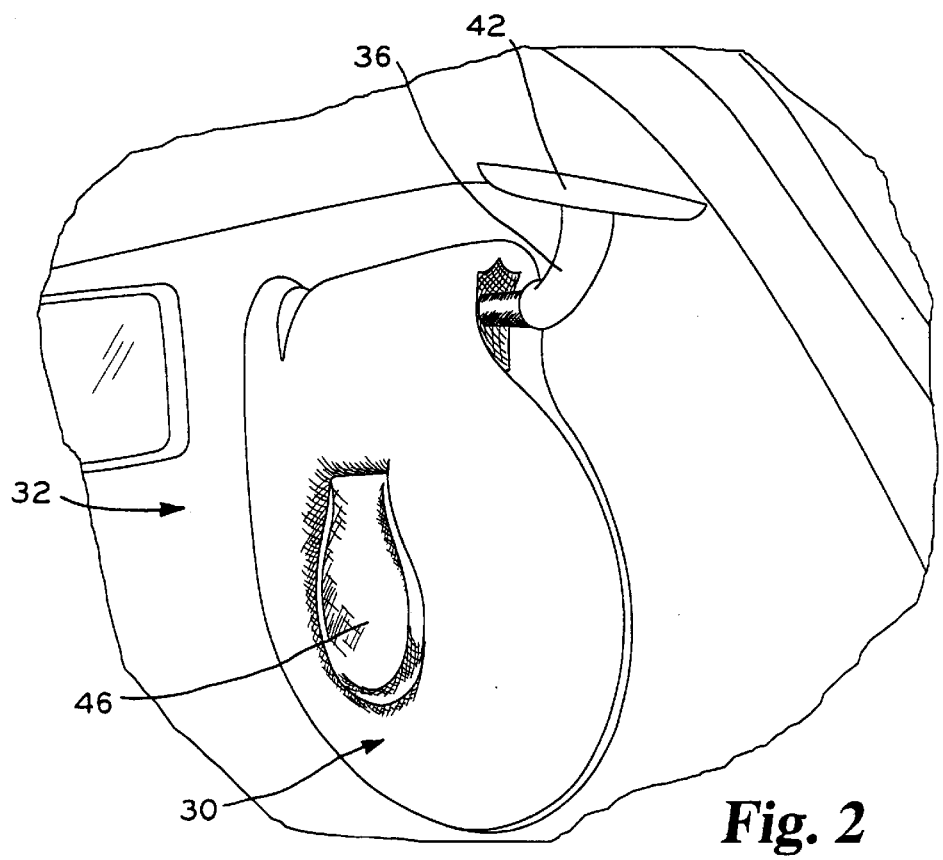
FIG. 2 is a perspective view the sun visor of FIG. 1 taken from an angle which illustrates the recessed vanity mirror.

Referring to FIG. 1, the illustrated visor assembly 30 is shown in vehicle interior 32 where visor 30 is connected to headliner 34 by visor support rod assembly 36 on the left side and retainer clip 38 on the right side. Sun visor 30 protects the occupant of the vehicle from bright sunlight and UV rays penetrating windshield 40. Sun visor 30 can be detached from clip 38 by removing pin 37 (that forms a part of a pin section assembly 39 shown in FIG. 4) and pivoting the visor about bracket assembly 42 to cover side window 44. Sun visor assembly 30 includes vanity mirror 46, which is attractively recessed within visor 30 as can be appreciated in FIG. 2.

Figure 3:
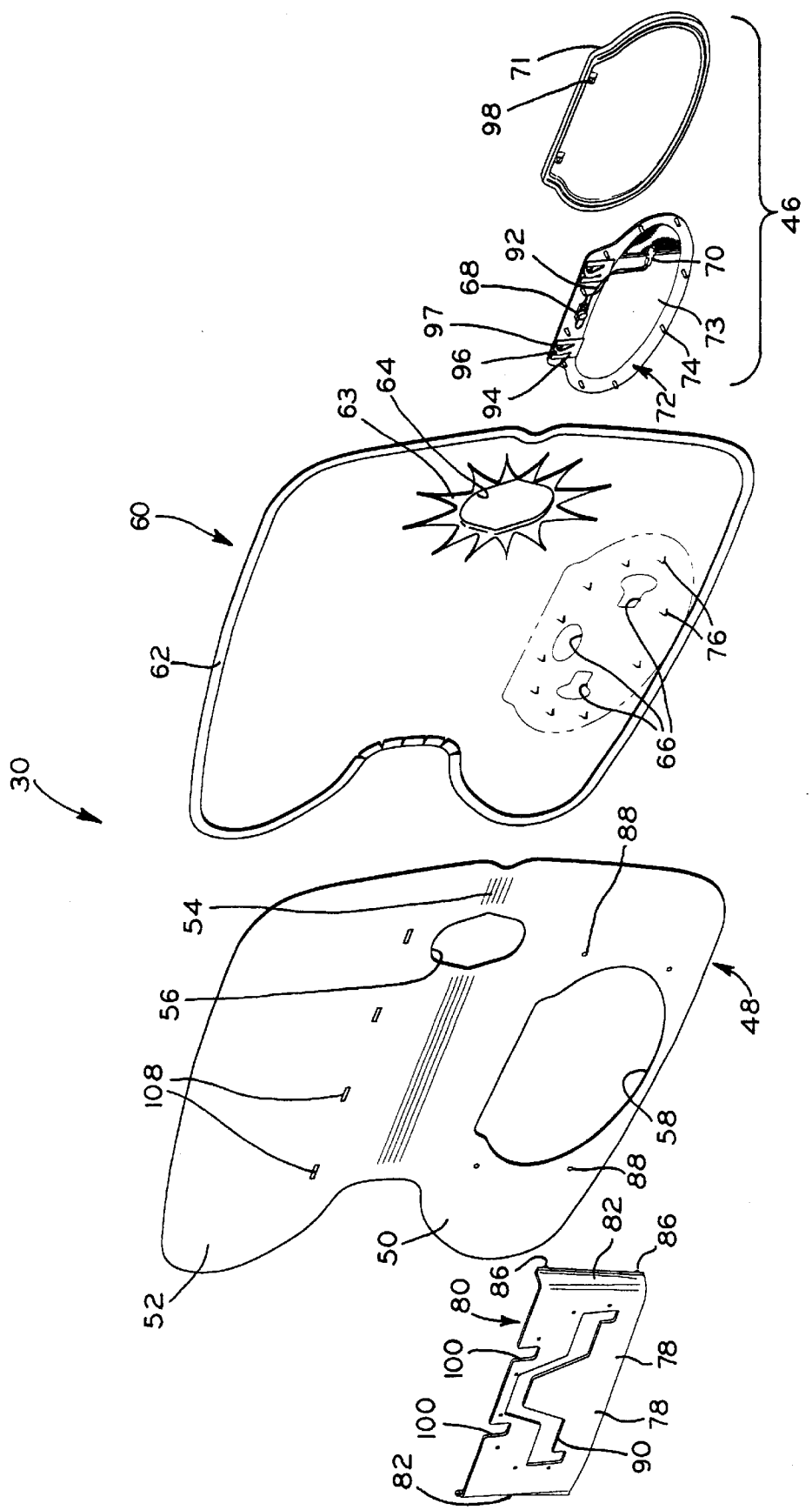
FIG. 3 is an exploded perspective view of a sun visor embodiment in accordance with the present invention.

Referring now to FIG. 3, the visor 30 is formed from shell 48, which is commonly referred to in the art as a "butterfly shell." Shell 48 is folded into two substantially symmetric shell halves 50 and 52, as is also well-known in the art. The preferable material for shell 48 is a kraft paper having a thickness of about 0.080 inches, although the thickness can vary from about 0.025 inches to 0.150 inches. While kraft paper is preferable because of its suitability and low cost, other materials of suitable stiffness and weight characteristics could be employed as shell 48. As shown in FIG. 3, score lines, or creases, 54 are formed into the cardboard shell so that the shell can be easily folded about an axis corresponding to the score lines during assembly. Thus, score lines 54 define a "living hinge" between shell halves 50 and 52. Shell 48 also includes a cut-out 56 to accomodate a pin section assembly 39 (FIG. 4) and an opening 58 to accommodate vanity mirror assembly 46.

Again referring to FIG. 3, sun visor 30 includes an upholstery cover 60, which is typically formed from a decorative vinyl outer covering bonded to a foam backing (not shown), as is known in the art. Cover 60 includes a peripheral edge 62 which folds around the periphery of shell 48 and is adhesively or otherwise bonded thereto, as is known in the art. During visor construction, a second adhesive is applied around the interior periphery of shell 48 and halves 50 and 52 are folded about score lines 54 and bonded together. Cover 60 includes a hole 64 that matches hole 56 to accommodate pin section assembly 39. Cover 60 includes a sawtooth edge 63 which folds to the inside of shell 48 and is bonded thereto by the same adhesive used for edge 62. Optionally, apertures 66 can be precut into cover 60 to facilitate wiring switch assembly 68, wires 92 and lighting fixture 70 shown on the back of vanity 46 Still referring to FIG. 3, vanity mirror assembly 46 includes hingably attached vanity cover 71. Vanity mirror assembly 46 further includes a mirror body 72 with mirror 73 (backside of mirror 73 shown in FIG. 3). Heat stakes 74 extend from the backside of mirror body 72, and during assembly of the vanity mirror to the sun visor, heat stakes 74 form dimples 76 in cover 60 and then "punch" through cover 60 and are received in holes 78 in plate member 80. Using heat stake technology, stakes 74 are then fused into holes 78 and secure vanity assembly 46 to sun visor 30. While the illustrated embodiment dicloses stakes being formed on the back of the vanity and the holes being formed in the plate member, it is envisioned that the converse of this arrangement would also work satisfactorily. That is, the stakes could be formed in the plate member and the holes formed in the back of the vanity mirror assembly.

Figure 6:
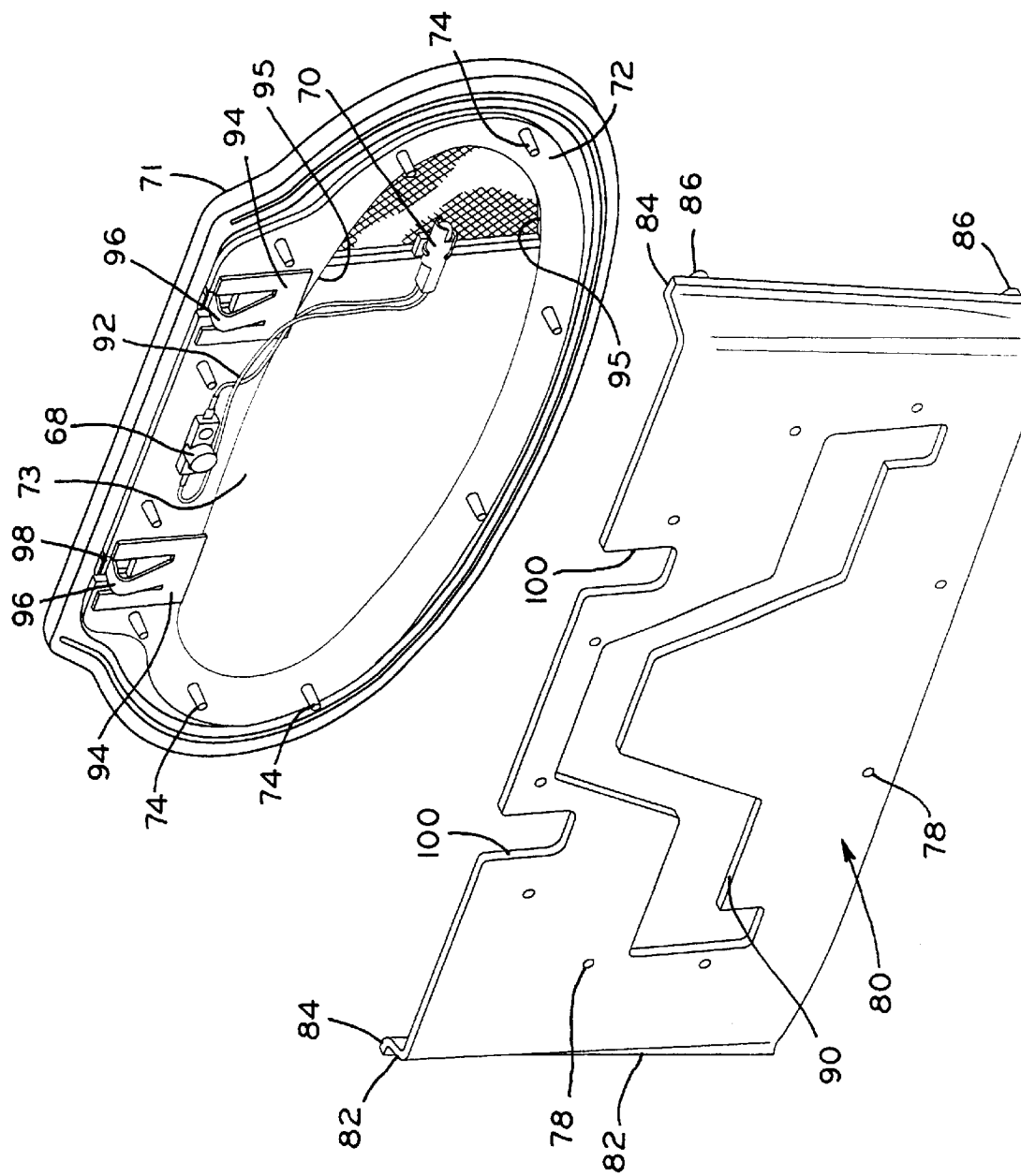
FIG. 6 is an exploded perspective view illustrating a vanity mirror and a plate member embodied by the present invention.

Referring to FIGS. 3 and 6, each side of plate member 80 includes a wall member 82 of variable height depending therefrom. Wall member 82 includes a flange 84 which forms a flat edge that abuts against shell half 50 (FIG. 3). In preferred embodiments, plate member 80 is integrally formed as one piece from ABS material which is formed by injection molding. However, other suitable materials could also be used, such as for instance, nylon, polypropylene or other suitable thermoplastic materials. Plate member 80 doubles as a traditional "core member" found in prior art sun visors, and a traditional core member is therefore unnecessary. As shown in FIG. 6, plate member 80 includes pegs 86 which protrude from flange 84 and insert into corresponding holes 88 formed in shell half 50 as shown in FIG. 3. Pegs 86 align plate member 80 with opening 58 during assembly of the sun visor. As further illustrated in FIG. 6, plate member includes a slot 90 shaped to accommodate wiring switch 68, wires 92 and lighting fixture 70. While the illustrated vanity mirror assembly 46 includes only one light 70, slot 90 formed in plate member 80 is symmetric about the plate member 80 and can accommodate a vanity mirror assembly having lights on both sides of the mirror.

As shown in FIG. 3 and noted above, vanity mirror assembly 46 includes a vanity cover 71 hingedly attached thereto. As shown in FIG. 6, hinge clips 94 have fingers 96 that extend through notches 97 in mirror body 72 and wrap around cylindrical posts 98 (FIG. 3) integrally formed with cover 71 to facilitate opening and closing of cover 71. With reference to FIG. 6, the edges of clips 94 as well as light 70 hold the mirror in place within recess 95 formed in mirror body 72. Plate member 80 includes square notches 100 which are adapted to receive a portion of the upholstery cover that is pushed into notches 100 by fingers 96 of hinge clips 94 as best seen in FIG. 4.

Figure 4:
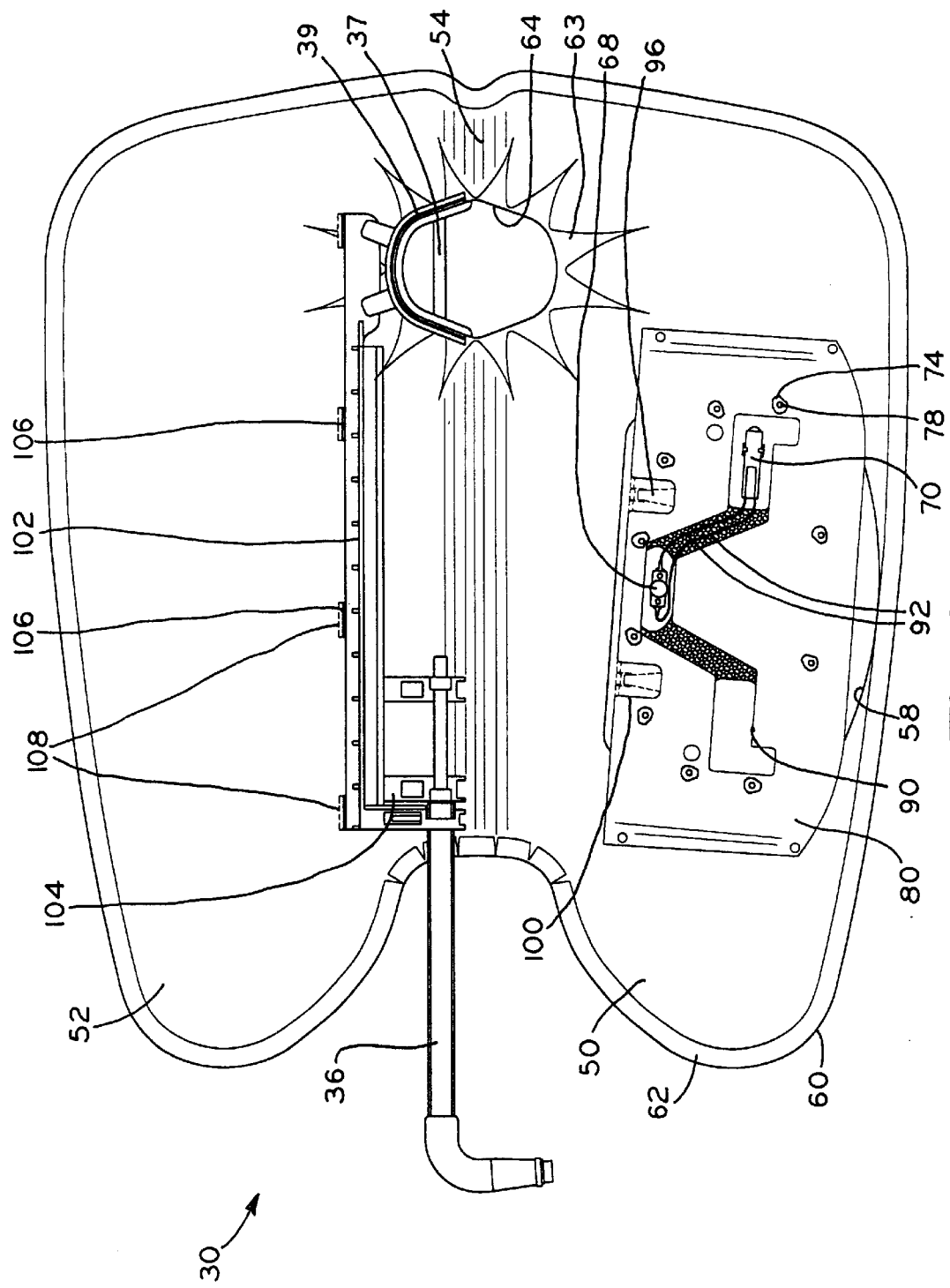
FIG. 4 is a plan view of a sun visor in accordance with an embodiment of the present invention, illustrating the interior parts of the sun visor before the two shell halves are folded together in final assembly.
Figure 5:
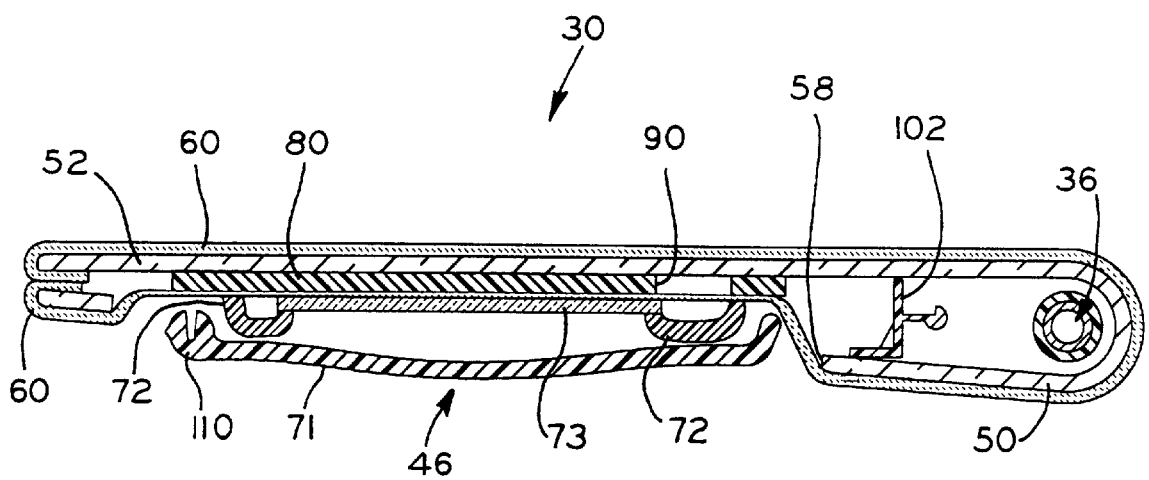
FIG. 5 is a sectional view taken along line 5—5 of FIG. 1.

With further reference to FIG. 4, visor assembly 30 includes support bracket 102 and hinge block 104, both of which receive rod assembly 36. A support bracket and hinge block similar to that disclosed in FIG. 4 are known in the art and are described, for example, in U.S. Pat. No. 5,823,603, owned by the assignee of the present invention, the disclosure of which is hereby incorporated by reference. Support bracket 102 includes feet 106 which are received in slots 108 formed in shell half 52 (FIG. 3), thereby holding bracket 102 in place. As can be appreciated with reference to FIG. 2, vanity mirror assembly 46 is attractively recessed within visor assembly 30. As seen in FIG. 5, visor 30 is thicker on the end which includes rod assembly 36 and support bracket 102 therewithin, shown on the right hand side of FIG. 5. Thus, the recess in embodiments in accordance with the present invention is formed deeper at one end to correspond to the varying thickness of sun visor 30.

The recessed configuration is achieved by the unique plate member 80. As seen in FIG. 6, plate member 80 includes wall members 82 of variable height, so that plate member 80 is spaced away from shell half 50, thereby creating a recessed cavity for reception of the vanity mirror. As seen in FIG. 5, plate member 80 is aligned substantially parallel to shell half 52, whereas plate member 80 is disposed on a slant relative to shell half 50. The slanted orientation of plate member 80 vis-à-vis shell half 50 results in cover 71 of vanity assembly 46 being spaced away from upholstery cover 60 at the thinner end (shown at left in FIG. 5) of visor 30. Stated another way, shell 50 forms a substantially planar front side of the sun visor, and plate member 80 is slanted relative to this front side. As a result of this configuration, edge 110 of cover 71 is easily accessible and opened by the fingers.

Advantageously, cover 60 is not separately adhered to shell half 50 around the periphery of opening 58 (FIG. 3) because the cover is stretched and held securely between plate member 80 and the back of mirror body 72. Further, as noted above, stakes 74 pierce through cover 60 and further secure it. Thus, as seen in FIG. 5, cover 60 is stretched into opening 58 and held there by vanity assembly 46.

The advantages of sun visor assembly 30 having recessed vanity mirror assembly 46 will be better appreciated with reference to the method of assembly of visor assembly 30. "Butterfly" shell 48 is formed in accordance with conventional methods well-known in the art. Notably, opening 58 in shell half 50 is formed larger than vanity mirror 46. The size of opening 58 is dependent upon a number of factors including mirror size and the like. Slots 108, holes 88 and cut-out 56 are punched into shell 50 by conventional means prior to cover 60 being adhered thereto.

As an optional step, desirable when the vanity mirror includes lighting as in the disclosed embodiment, apertures 66 (FIG. 3) may be pre-formed into cover 60 before it is adhered to shell 48. Cover 60 at least partially covers the opening 58. Advantageously, only edge 62 of cover 60 and sawtooth edge 63 need be adhered to shell 48. Any one of several adhesives known in the art can be used for this purpose.

After cover 60 is adhered to shell 48, the interior components of sun visor assembly 30 are positioned within shell 48. Support bracket 102, hinge block 104 and pin section assembly 39 can be pre-assembled and then placed into shell 48 so that feet 106 fit into slots 108 and pin section assembly 39 is received in cut-out 56. Plate member 80 is positioned in shell 50 by inserting pegs 86 thereof into holes 88 formed in shell half 50. Next, the vanity mirror assembly 46 can be pressed into opening 58 and stakes 74 fused into holes 78 via heat stake technology. Heat stake technology is known in the art and is therefore not described in detail herein. It should also be noted that instead of heat staking, mirror body 72 could be secured to plate member 80 by a snap fit. Still further, mirror body 72 could be secured to plate member 80 by sonic welding. Advantageously, cover 60 is held securely in place between plate member 80 and the back of mirror assembly 46. Finally, adhesive can be applied proximate edge 62 and the two halves 50 and 52 folded and held together until the adhesive cures. Many suitable adhesives are known in the art and can be used to secure theshell halves together, such as Plio Grip urethane sold by Ashland Chemical Company. The interior components, such as plate member 80 and bracket 102, are held securely between shell halves 50 and 52 in the assembled sun visor.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A sun visor for use in a vehicle, comprising:
   a vanity mirror assembly having an outer periphery;
   a shell comprising first and second shell halves folded together, said first shell half including an area defining by an outline corresponding to said outer periphery of said vanity mirror assembly; and
   a plate member disposed between said shell halves and aligned with said outline, said plate member disposed on a slant relative to said first shell half, and said vanity mirror assembly disposed proximate said outline and attached to said plate member.

2. The sun visor of claim 1, wherein one of said plate member and said vanity mirror assembly includes stakes and the other of said vanity mirror and said plate member includes holes, said stakes fused into said holes.

3. The sun visor of claim 2, wherein said plate member includes said holes and said vanity mirror assembly includes said stakes.

4. The sun visor of claim 2, further comprising an upholstery cover covering an exterior of said shell, a portion of said upholstery cover disposed over said outline, one of said stakes extending through said portion.

5. The sun visor of claim 1, wherein said plate member is aligned substantially parallel to said second shell half.

6. The sun visor of claim 5, wherein said plate member further includes a wall member depending therefrom, said wall member being of variable height and having a substantially flat edge abutting against said first shell half, whereby said wall member defines said slant.

7. The sun visor of claim 1, wherein said shell is one-piece, said first and second shell halves defining a living hinge therebetween.

8. The sun visor of claim 1, wherein an upholstery cover covers an exterior of said shell.

9. The sun visor of claim 8, wherein a portion of said cover is disposed over said outline, said portion disposed between said vanity mirror assembly and said plate member.

10. The sun visor of claim 1, wherein said plate member is spaced away from said first shell half, thereby creating a cavity for said vanity mirror assembly.

11. A sun visor assembly, comprising:
    a sun visor body, said body comprising a shell, said shell defining an opening;

an upholstery cover disposed on an exterior surface of said shell, a portion of said upholstery cover spanning said opening;

a plate member disposed interiorly of said shell and aligned with said opening; and a vanity mirror disposed proximate said opening and attached to said plate member, said portion of said cover disposed between said vanity mirror and said plate member.

12. The sun visor of claim 11, wherein said opening is disposed in a substantially planar front side of said sun visor, said plate member being slanted relative to said front side.

13. The sun visor of claim 12, wherein said plate member further includes a wall member depending therefrom, said wall member being of variable height and having a substantially flat edge abutting against said shell, whereby said wall member defines said slant.

14. The sun visor of claim 11, wherein said vanity mirror includes a stake extending from a back side thereof, said plate member includes a hole, said stake fused into said hole.

15. The sun visor of claim 14, wherein said stake extends through said upholstery cover.

16. The sun visor of claim 11, wherein said shell is one-piece and is folded into first and second shell halves, said first and second shell halves defining a living hinge therebetween.

17. The sun visor of claim 16, further comprising an adhesive disposed between said shell halves and securing said shell halves together.

18. A method of installing a vanity mirror in a sun visor of the type having a substantially self-supporting relatively thin shell folded into two shell halves with an upholstery cover covering the shell, the method comprising the following steps:

forming an opening in one of the shell halves to accommodate the vanity mirror;

installing an upholstery cover on an exterior surface of the shell with at least a portion of the upholstery cover spanning the opening; and placing a plate member against an inside surface of the shell half having the opening and aligning the plate member with the opening; and aligning the vanity mirror with the opening and fusing a stake extending from a backside of the vanity mirror into a hole formed in the plate member, thereby securing the vanity mirror to the sun visor.

19. The method of claim 18, further comprising applying an adhesive to the interior of at least one of the two shell halves and folding the two shell halves together, thereby adhering the shell halves together.

20. The method of claim 18, further comprising pushing the stake through the upholstery cover before the fusing of the stake into the hole.

21. The sun visor of claim 1, wherein one of said plate member and said vanity mirror assembly includes stakes and the other of said vanity mirror assembly and said plate member includes holes, said stakes snap-fit into said holes.

22. The sun visor of claim 11, wherein said vanity mirror includes a stake extending from a backside thereof, said plate member includes a hole, said stake snap-fit into said hole.

23. The method of claim 18, wherein the aligning step comprises aligning the vanity mirror with the opening and snap-fitting a stake extending from a backside of the vanity mirror into a hole formed in the plate member, thereby securing the vanity mirror to the sun visor.

* * * * *